United States Patent [19]
Marlette

[11] Patent Number: 5,836,169
[45] Date of Patent: Nov. 17, 1998

[54] COFFEE BREWER INCLUDING REFRIGERATED STORAGE RECEPTACLE

[76] Inventor: Todd E. Marlette, 2111 Jefferson Davis Hwy. Suite 211 South, Arlington, Va. 22202-3116

[21] Appl. No.: 790,102

[22] Filed: Jan. 29, 1997

[51] Int. Cl.$^6$ ..................................................... F25D 15/00
[52] U.S. Cl. .................................. 62/331; 62/3.2; 99/290
[58] Field of Search ............................... 62/3.2, 3.3, 331; 99/290–278, 281; D34/14; D07/300, 309, 310

[56] References Cited

U.S. PATENT DOCUMENTS

| | | | |
|---|---|---|---|
| D. 188,154 | 6/1960 | Frick ........................................ | D81/10 |
| D. 200,149 | 1/1965 | Bastian ...................................... | D2/3 |
| D. 335,061 | 4/1993 | Roberts ..................................... | D7/306 |
| D. 340,831 | 11/1993 | Manabe ..................................... | D7/305 |
| 2,845,780 | 8/1958 | Conklin et al. ........................... | 62/331 |
| 3,641,918 | 2/1972 | Schellgell .................................. | 99/279 |
| 4,495,404 | 1/1985 | Carmichael ............................... | 219/281 |
| 4,624,395 | 11/1986 | Baron et al. ............................ | 222/129.1 |
| 4,728,281 | 3/1988 | McGuffin et al. ..................... | 426/433 |
| 4,791,861 | 12/1988 | Weinkle et al. ........................... | 99/357 |
| 4,823,984 | 4/1989 | Ficken ...................................... | 221/96 |
| 4,974,500 | 12/1990 | Boyd et al. ................................ | 99/279 |
| 4,999,470 | 3/1991 | Fuchs, Jr. ......................... | 219/10.55 F |
| 5,095,185 | 3/1992 | Fuchs, Jr. ......................... | 219/10.55 E |
| 5,133,247 | 7/1992 | Pastrick .................................... | 99/295 |
| 5,150,803 | 9/1992 | Cartellone ............................... | 215/357 |
| 5,183,998 | 2/1993 | Hoffman et al. ........................ | 219/492 |
| 5,207,148 | 5/1993 | Anderson et al. ......................... | 99/281 |
| 5,285,718 | 2/1994 | Webster et al. ............................ | 99/290 |
| 5,367,607 | 11/1994 | Hufnagl et al. .......................... | 392/465 |
| 5,392,694 | 2/1995 | Muller et al. ............................. | 95/295 |
| 5,465,650 | 11/1995 | Friedrich et al. ......................... | 99/286 |
| 5,603,230 | 2/1997 | Tsai ......................................... | 62/390 |

OTHER PUBLICATIONS

Yearly World Coffee Consumption Per Person (in Kilograms), Lavazza Training Center: Coffee Consumption Worldwide Chart, http://sovrana.com/chart.htm Dec. 29,1997.

Igloo, Thermoeletric Coolers & Warmers, Owner's Manual, Kool/Mate, The Electric Igoo. ©1994 Igloo Products Corp. Houston, YX, rev. May 1994.

Service Merchandise 1994/1995 Jewelry and General Merchandise Catalog, pp. 236–240, 249.

*Primary Examiner*—William Doerrler

[57] ABSTRACT

A coffee brewing station includes in combination with a refrigerated receptacle for storing a plurality of coffee related items such as sugar, milk, and cream. The brewing station is surrounded on at least one side by a brewer inner case and a brewer outer case. An insulating barrier is disposed between a portion of said receptacle inner case and said receptacle outer case. An article case connected to the brewer outer case and the receptacle outer case such that the article outer case, the brewer outer case and the refrigerated receptacle outer case define a void.

20 Claims, 4 Drawing Sheets

COFFEE BREWER INCLUDING REFRIGERATED STORAGE RECEPTACLE

This application is a continuation of provisional patent application Ser. No. 60/010,708 filed Jan. 29, 1996.

BACKGROUND OF THE INVENTION

The present invention relates to the art of coffee brewers in combination with additional small appliances. More particularly, the present invention relates to the art of coffee brewers in combination with a refrigerated receptacle for storing a plurality of items including coffee related items such as sugar, milk, and cream.

Coffee has found renewed interest among consumers in the United States of America and abroad. In fact a recent study has indicated that American consumers purchase 1.2 million metric tons of coffee annually. In support of this growing fascination with coffee, a demand has been created for an efficient and practical apparatus for brewing a small or limited amount of coffee. Enter the automatic drip coffee maker, which may brew small, medium or large servings in a very short period of time.

As the number of coffee consumers increases, it appears that a growing number of consumers are becoming dissatisfied with the quality of so-called instant coffees, i.e. coffee crystals that may be combined with hot water for a single serving. Instead, consumers are witnessing a growing trend toward high quality, freshly brewed coffee from original bean stock. Gourmet coffee beans are vogue with many coffee mavins freshly grinding their own beans. Many of these coffee consumers will settle for nothing less than absolute freshness in all of their coffee products including sugar, milk, and cream.

Unfortunately, the small appliance market has failed to recognize this consumer demand. For example, in many environments such as offices, work rooms, college dorms, and break rooms, one may readily expect to find an automatic drip coffee maker. However, due to space considerations, added cost, or oversight, many of the aforementioned environments lack the necessary refrigeration for, maintaining peak product freshness. Instead of fresh milk, cream and sugar, many coffee serving environments are stocked with packet sugar, non-dairy creamer, and simply devoid of milk.

While many consumers understand that milk or cream will easily sour at room temperatures, consumers are now beginning to realize that other commodities such as coffee beans and sugar may be refrigerated to help maintain peak freshness. However, many individuals forgo refrigeration due to space or economic considerations.

A number of prior devices and apparatuses have attempted to address some of the above-mentioned needs of the modern consumer. Boyd et al., U.S. Pat. No. 4,974,500, disclose a hot beverage preparation and dispensing cart which incorporates a sink and a refrigerator. However, Boyd et al. address the problems of commercial vending in environments such as hotel lobbies, convention hall corridors, and outdoor cafes. Accordingly, Boyd et al. do not address the specific problems found in the office or college dorm.

Carmichael, U.S. Pat. No. 4,495,404, discloses a self-contained, compact, electric brewing kit. According to Carmichael, a molded plastic container houses a number of coffee accessories such as cups, lids, water, and a number of storage compartments. When a consumer is ready for a hot cup of coffee, the kit is disassembled, the accessories are unpacked, and the water is heated in a heating reservoir. The coffee and the condiments included in the kit are then mixed. However, Carmichael, does not include refrigeration.

A number of other apparatuses have combined coffee making and refrigeration but do not address the needs of the office or college dorm room. Schellgell et al., U.S. Pat. No. 3,641,918, disclose an automatic coffee dispenser in which a refrigerated chamber includes liquid coffee concentrate; Webster et al., U.S. Pat. No. 5,285,718, disclose a combination beverage brewer and cold water supply; and Anderson et al., U.S. Pat. No. 5,207,148, disclose an automatic coffee apparatus including a refrigerated milk supply. However, the above devices do not lend themselves to ready placement at the corner of an office desk or on a bookshelf.

Growing consumer demand for coffee and coffee related products has also sparked a number of novelty items such as Manabe, U.S. Pat. No. Des. 340,831, for a combination toaster oven and coffee maker, and Fuchs, Jr., U.S. Pat. No. 5,095,185, for a microwave coffee maker.

SUMMARY OF THE INVENTION

Accordingly, it is an object of the present invention to provide a coffee brewer including a refrigerated storage receptacle which overcomes the disadvantages of the prior art.

It is a further object of the present invention to provide a coffee brewer including refrigeration which may be readily used in a small working environment such as an office or college dorm.

It is still a further object of the present invention to provide a refrigerated receptacle for storing milk and cream in combination with a coffee brewing apparatus which may fit on a bookshelf.

It is a further object of the present invention to provide a coffee brewing apparatus including a sealed storage compartment which resists infestation of food products stored therein.

It is yet another object of the present invention to provide a coffee station in which a consumer may store refrigerated coffee beans, grind coffee beans, and brew coffee in either a coffee maker or espresso maker.

Is still another object of the invention to provide a compact refrigerated storage receptacle which may store a standard quart sized carton of milk, a standard pint sized carton of cream, half & half, a coffee cup, or a bowl of sugar.

It is another object of the invention to provide a compact bookshelf coffee maker which adequately maintains a heated pot of coffee and a chilled storage compartment for storing milk, cream, and the like.

Moreover, it is object of the invention to provide a compact bookshelf coffee maker in combination with a chilled storage compartment wherein the storage receptacle may alternatively function as a warming device for warming food products and the like.

Objects of the invention are achieved by an article of manufacture including a brewing device for brewing coffee or related beverages; a refrigerated receptacle having a frontwardly openable door; a molded case permanently connecting the brewer to the refrigerated receptacle, the molded case defining a void below the brewing device which is so configured and arranged to removably receive a coffee pot; and a heating element permanently connected to the molded case about a bottom portion of the void to support and warm the coffee pot.

Further objects of the invention are achieved by an article of manufacture including a brewing device for brewing coffee or related beverages; a brewer inner case surrounding at least one side of and permanently connected to the brewing device, the brewer inner case defining at least one side of a void below the brewing device, wherein the void is so configured and arranged to removably receive a coffee pot; a refrigerated receptacle including a receptacle inner case which mates with a frontwardly openable door; and an outer case permanently connected to the brewer inner case and the receptacle inner case, wherein the outer case, the brewer inner case and the receptacle inner case define an air impermeable pocket such that the pocket separates the brewer inner case and the receptacle inner case.

Even further objects of the invention are achieved by an article of manufacture including a brewing device for brewing coffee or related beverages; a refrigerated receptacle having a frontwardly openable door; a molded case permanently connecting and surrounding the brewing device and the refrigerated receptacle, wherein the molded case has a length equal to or less than 36 inches, and a height equal to or less than 24 inches.

The aforementioned and other objects, features, and advantages of the present invention will become readily apparent from the following description of the preferred embodiments, as well as from the accompanying drawings, all of which merely illustrate an inventive concept of the present invention, and are not in any way intended, nor should they be construed, to limit the scope of the present invention.

DETAILED DESCRIPTION OF THE PREFERRED EMBODIMENTS

Figure 1:
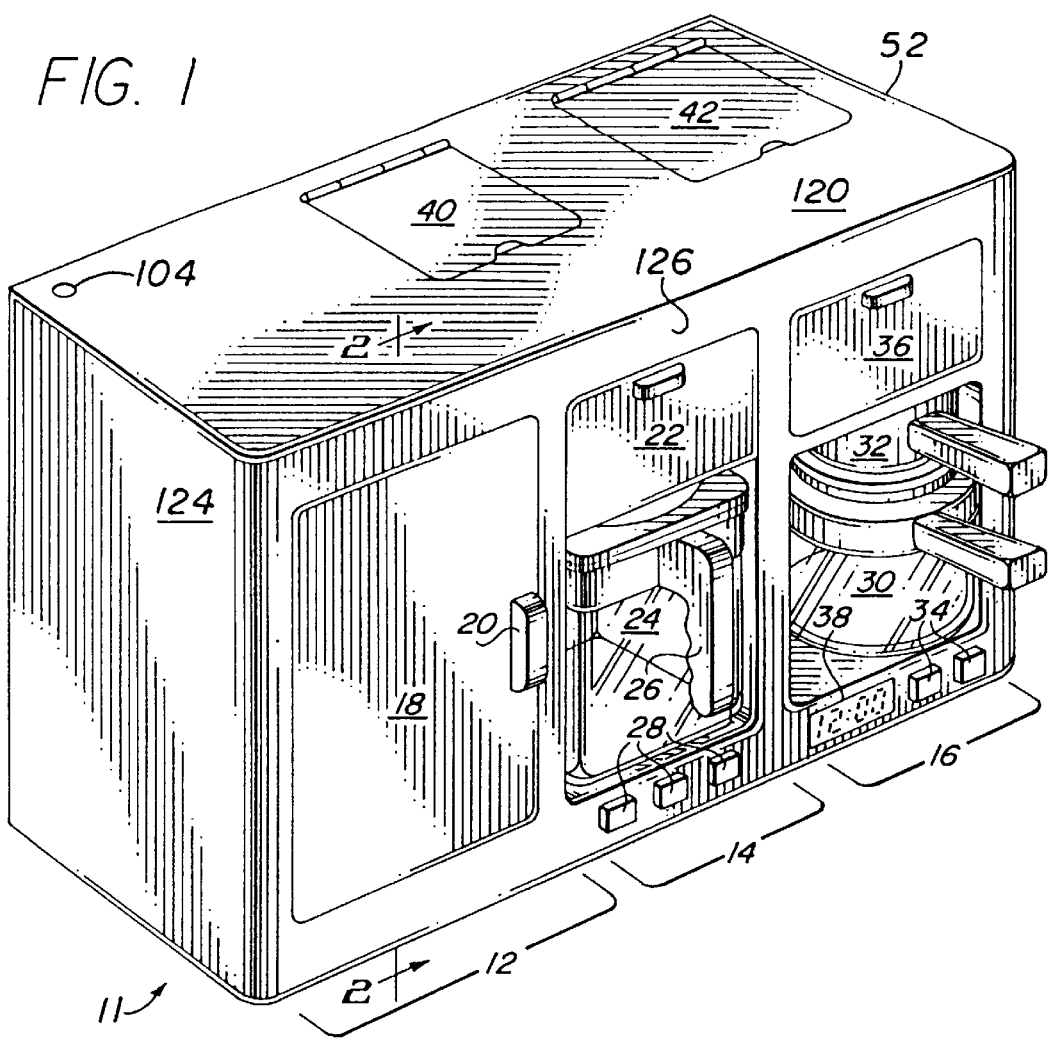
FIG. 1 is an elevated perspective view of a coffee brewing station according to a preferred embodiment of the present invention.

With reference now to the drawings and more particularly to FIG. 1, preferred embodiments of the present invention are shown and described.

Figure 6:
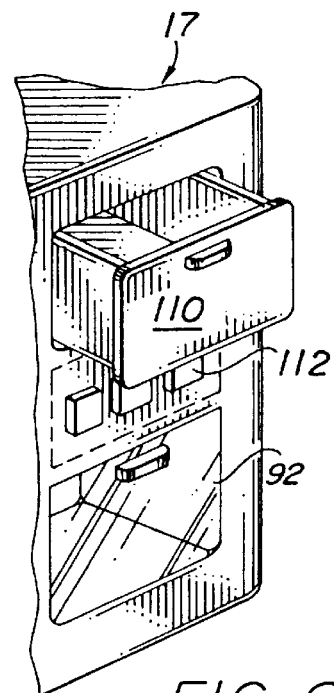
FIG. 6 is an elevated perspective view of a bean grinding accessory according to another preferred embodiment of the present invention.
Figure 7:
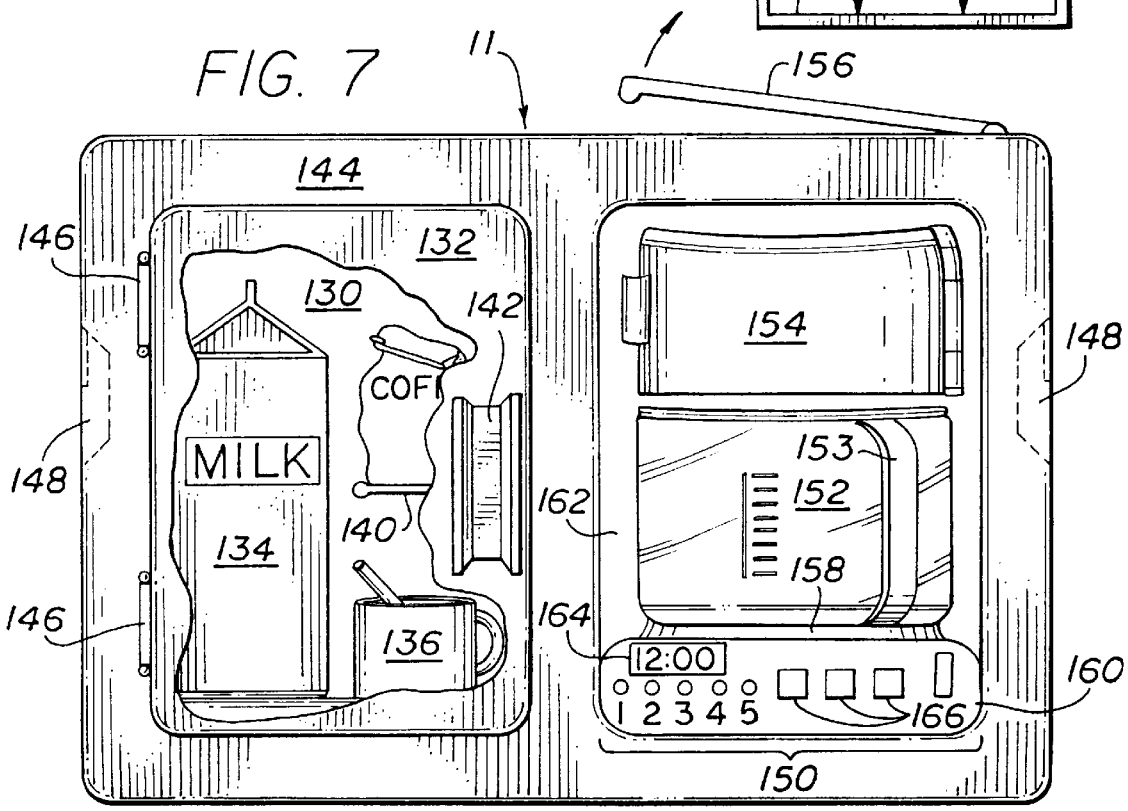
FIG. 7 is a front view of a coffee brewing station according to yet another preferred embodiment of the present invention.

As illustrated in FIG. 1, brewing station 11 includes a number of individual appliance units such as refrigerated storage unit 12, coffee brewing unit 14, espresso unit 16, and grinding unit 17 (FIG. 6). However, according to differing embodiments as illustrated in FIG. 7, brewing station 11 consists of refrigerated storage unit 12 and coffee brewing unit 14. Accordingly, it is noted that the preferred embodiment or "basic unit" consists of refrigerated storage unit 12 and coffee brewing unit 14 with espresso unit 16 considered an optional accessory.

Figure 2:
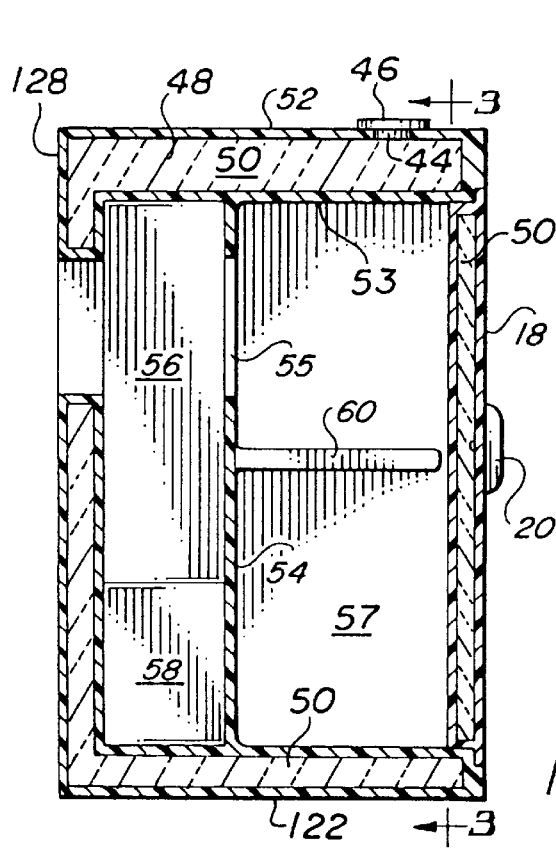
FIG. 2 is a side sectional view illustrating a refrigerated storage compartment of the coffee brewing station of FIG. 1.

FIG. 1 illustrates coffee brewing station 11 having brewing station top 120, brewing station bottom 122 (FIG. 2), brewing station sides 124, brewing station face 126, and brewing station back 128 (FIG. 2). Coffee inlet 40 and espresso inlet 42 are disposed on brewing station top 120.

Refrigerated storage unit 12 is contained within molded outer case 52 along with brewing unit 14. Apart from connection by way of an insulating barrier described below and a common power supply, refrigerated storage unit 12 and brewing unit 14 contain separate components. Storage unit 12 and brewing unit 14 are separated by an air impermeable member and a liquid impermeable member. Accordingly, the potential for interaction between storage unit 12 and brewing unit 14 is minimized.

Refrigerated storage unit 12 includes door 18 which affords access thereto. Door 18 is opened to gain entry into storage unit 12 by way of handle 20. As illustrated in the embodiment according to FIG. 1, storage unit 12 appears flush with molded outer case 52, to present an aesthetically pleasing appearance, although no particular limitation should be inferred.

Brewing unit 14 includes coffee pot 24. Coffee pot 24 receives automatic drip coffee from a combination of water and coffee grinds which are placed into coffee basket 22. Coffee basket 22 is slidably received within molded outer case 52 above coffee pot 24. Coffee pot 24 includes handle 26 which protrudes outwardly therefrom to afford removal from molded case 52. A face of coffee pot 24 appears flush with a frontal plane of molded outer case 52 and door 18. Control panel 28 controls the operation of brewing unit 14 to vary the strength and quantity of the coffee brewed. Water is poured into coffee brewing unit 14 by way of coffee inlet 40. As outlined below and as illustrated in FIG. 1 vacuum valve 104 is optionally provided according to an embodiment of the present invention in which a vacuum insulation barrier is provided. In this case, air from within an internal vacuum chamber is withdrawn by way of vacuum valve 104 so that heat transfer between refrigerated storage unit 12 and brewing unit 14 is reduced.

Espresso unit 16, which is included in the embodiment of FIG. 1, includes espresso pot 30, steamer unit 32, and espresso basket 36. Espresso basket 36 holds ground coffee which is then steamed with milk or water depending upon consumer preference. Espresso control panel 34 controls the operation of espresso unit 16. Clock 38 indicates the time of day and allows programmability of coffee brewing station 11 by way of internal circuitry (not shown). Accordingly, a consumer may program brewing station 11 to prepare fresh hot coffee or espresso at a predetermined time. Water and/or milk is poured into Espresso unit 16 by way of espresso inlet 42.

Turning now to FIG. 2, a side sectional view of refrigerated storage unit 12 is illustrated. Refrigerated storage unit 12 includes backing plate 54 which separates storage space 57 from electronic compartment 58 and cooling unit compartment 56. Cooling unit compartment 56 houses a cooling unit which supplies cool air to storage space 57 by way of cooling vent 55. Storage shelf 60 (also shown in FIG. 3) is attached to storage unit inner case 53 and is structurally supported to hold a cup of sugar or a half pint of cream. As illustrated, insulation barrier 50 is disposed between molded inner case and molded outer case 52.

Insulation barrier 50 is preferably an encapsulated foam such as that sold under the trademark STYROFOAM. However, insulation barrier 50 could be made from fiberglass, encapsulated plastic, or partially encapsulated foam. According to an embodiment of the present invention, insulation barrier 50 is made from encapsulated foam board which has been cut and placed between molded outer case 52 and storage unit inner case 53.

Figure 5:
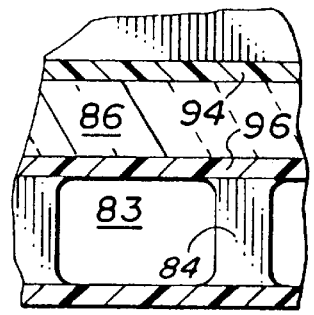
FIG. 5 is partial side sectional view of the insulating barrier of FIG. 4.

According to an alternative embodiment, molded outer case 52 is first affixed to storage unit inner case 53 with epoxy glue to form inner cavity 48. Next, insulation barrier 50, in the form of an expandable insulating foam, is injected into inner cavity 48 by way of foam injection orifice 44 and allowed to harden. Foam injection cap 46 is then secured over foam injection orifice 44 to effect sealing thereof. It should be noted that a plurality of injection orifices 44 may be placed in varying locations throughout the body of coffee brewing station 11 (including door 18) as a matter of design choice to ease the insertion of foam therein. As a further note, interior webbing with a webbing orifice disposed therein may be provided about inner cavity 48 (as shown in FIG. 5) to provide structural support while allowing the expansion of foam therein. Molded outer case 52 and storage unit inner case 53 are preferably made from nonconductive plastic or vinyl.

Figure 3:
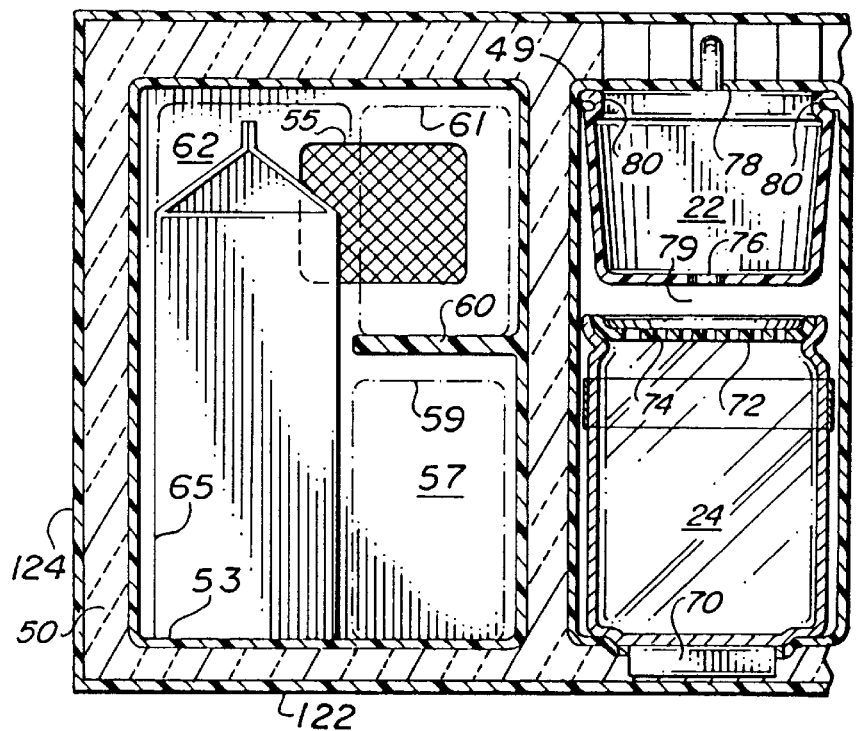
FIG. 3 is a front sectional view of the coffee brewing station of FIG. 1 illustrating an insulation barrier.

Turning now to FIG. 3, a front sectional view of coffee brewing station 11 is illustrated. As illustrated, molded outer case 52 defines an outer periphery while storage unit inner case 53 is support inside by insulation barrier 50. Storage unit inner case 53 defines storage space 57 which further includes first space 59 and second space 61. First space 59 is separated from second space 61 by way of storage shelf 60. Quart container space 62 is shown adjacent to shelf 60 and is arranged to hold a quart sized container such as that commonly used to hold a quart of milk. Milk container 65 is shown occupying quart container space 62. Shelf 60 is preferably removable such that a consumer may store larger items within storage space 57 such as a half gallon carton or a beverage pitcher. It is also contemplated that non-coffee related products and/or beverages may be stored within refrigerated storage unit 12 such as soda, sandwiches, and related condiments such as mustard and ketchup.

As illustrated in FIG. 3, insulation barrier 50 separates storage space 57 from coffee pot 24 and heating element 70. Insulation barrier 50 is surrounded on both sides thereof by molded outer case 52 and a combination of inner cases such as storage unit inner case 53 and coffee unit inner case 49. Coffee unit inner case 49 defines coffee pot region 79 in which coffee pot 24 and coffee basket 22 are disposed. Although not particularly illustrated, espresso unit 16 and grinding unit 17 (FIG. 6) each include a respective molded inner case substantially similar to storage unit inner case 53 and coffee unit inner case 49 which is separated from molded outer case 52 by way of insulation barrier 50.

Insulation barrier 50 is preferably made from encapsulated foam such as that sold under the trademark STYROFOAM. Insulation barrier 50 provides effective insulation between the cold area of storage space 57 and coffee pot 24 and heating element 70. Insulation barrier 50 also provides an insulation barrier between all respective appliance units set forth above as well as maintaining insulation from molded outer case 52. In the embodiment of FIG. 3, insulation barrier 50 provides support for the inner appliance units.

Figure 3A:
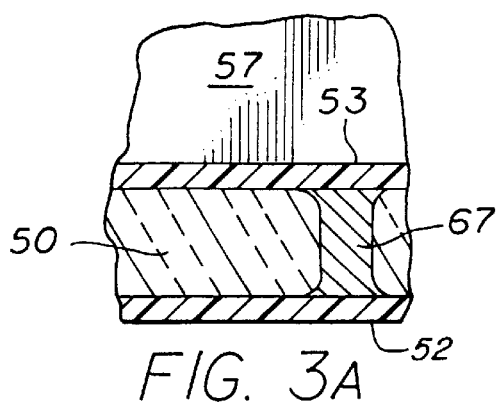
FIG. 3A–3B is an enlarged front sectional view of an insulation barrier according to a preferred embodiment of the present invention.

As illustrated in FIG. 3A, a number of webbing members such as support webbing member 67 may be disposed between molded outer case 52 and the respective inner appliance cases such as storage unit inner case 53. As illustrated, insulation barrier 50 is disposed between outer case 52 and storage unit inner case 53. Insulation barrier 50 may be precut foam or may be injected through foam injection cap 46 (FIG. 2).

Turning back to FIG. 3, coffee pot 24 and coffee basket 22 are disposed adjacent to storage space 57. Coffee basket 22 is slidably received within coffee unit inner case 49. To facilitate interaction with coffee basket 22, a pair of ribs 80 extend outwardly from the interior of inner case 49 and are arranged to slidably mate with a recess molded into the sides of coffee basket 22. Hot water enters coffee basket 22 by way of water input 78. Water then mixes with ground coffee (not shown) and passes through a coffee filter (not shown). Filtered coffee is then released into coffee pot 24 by way of coffee basket passage 76. A plurality of orifices 74 are disposed in coffee pot lid 72 for facilitating entry of coffee into coffee pot 24.

Coffee pot 24 is placed on heating element 70 to maintained the coffee within coffee pot 24 at a desired temperature. The temperature of the coffee within pot 24 may be adjusted by way of control panel 28 (FIG. 1). According to the embodiment of FIG. 3, heating element 70 is placed below storage space 57 in refrigerated storage unit 12 to reduce heat transfer therebetween. According to this embodiment, heating element 70 is surrounded by insulation barrier 50 as shown.

Figure 3B:
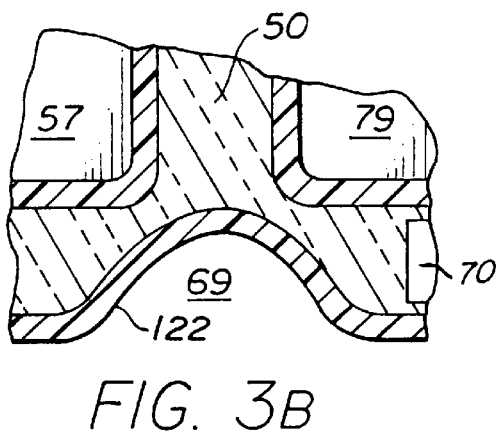

According to an alternative embodiment, as illustrated in FIG. 3B, a physical ridge in the form of indentation 69 is disposed in molded outer case 52 about brewing station bottom 122 to provide a greater insulating effect between heating element 70 and refrigerated storage space 57. While this indentation may appear about the lower portion of brewing station face 126 between refrigerated storage unit 12 and brewing unit 14, it is preferable that brewing station face 126 appear flush across the bottom thereof to maintain an aesthetically pleasing appearance.

Figure 4:
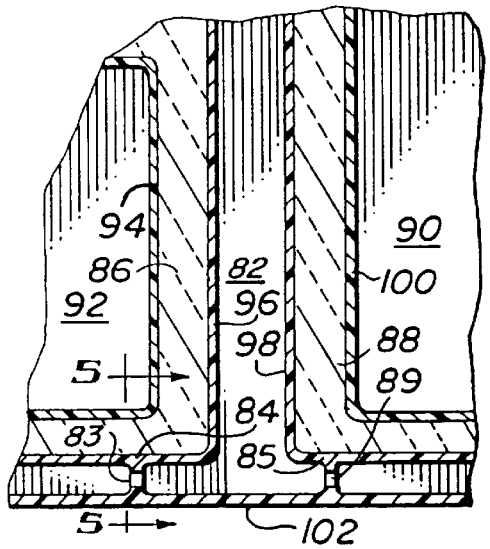
FIG. 4 is a partial sectional view of an insulating barrier according to another preferred embodiment of the present invention.

FIGS. 4 and 5 illustrate a partial sectional view of an insulating barrier according to an embodiment of the present invention, with FIG. 5 orthogonal to FIG. 4. FIG. 4 is significantly different from FIG. 3 in that the insulation barrier as shown provides additional protection. According to FIG. 4, an internal structural arrangement of coffee brewing station 11 is illustrated. Coffee brewing station 11 includes coffee pot space 90 and refrigerated storage space 92 which are separated by vacuum layer 82. First insulation layer 86 and second insulation layer 88 are respectively disposed on alternate sides of vacuum layer 82. First, second, third, and fourth structural members 94, 96, 98, and 100 respectively, are disposed on alternate sides of first insulation layer 86 and second insulation layer 88. Second structural member 96 and fourth structural member 100 are respectively supported by outer casing 102 by way of first webbing member 84 and second webbing member 85, respectively. First vacuum layer orifice 83 and second vacuum layer orifice 89 are respectively disposed within first webbing member 84 and second webbing member 85 such that air within vacuum layer 82 may be removed by way of vacuum valve 104 (FIG. 1).

Figure 4A:
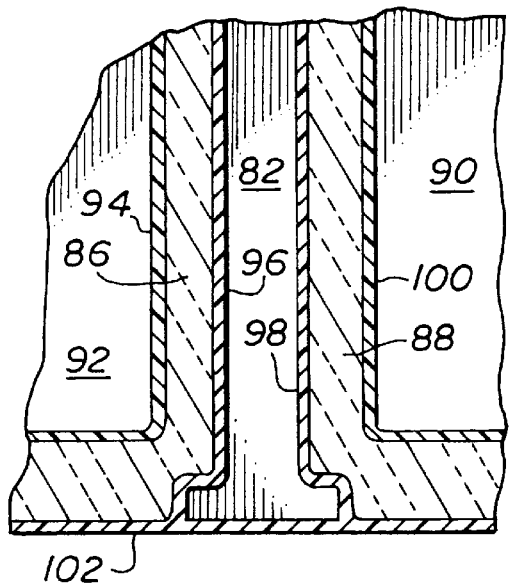
FIG. 4A is a partial sectional view of an insulating barrier according to yet another preferred embodiment of the present invention.

In reference now to FIG. 4A, an insulating barrier is illustrated according to an embodiment of the present invention. As illustrated, refrigerated storage space 92 and coffee pot space 90 are separated by vacuum layer 82. First, second, third, and fourth structural members 94, 96, 98, and 100 respectively, are disposed on alternate sides of first insulation layer 86 and second insulation layer 88. Second structural member 96 and fourth structural member 100 are respectively attached to outer casing 102 with vacuum layer 82 disposed on an inside thereof and insulation layers 86 and 88 disposed on the outside thereof. FIG. 4A is markedly different from FIG. 4 in that first webbing member 84 and second webbing member 85 are not necessary. First insulation layer 86 and second insulation layer 88 in this case may be used as structural supports for second structural member 96 and fourth structural member 100. Construction is also greatly simplified in that vacuum layer 82 is only disposed between refrigerated storage space 92 and coffee pot space 90. In this case, vacuum valve 104 would be moved from its location atop coffee brewing station 11 to be directly over vacuum layer 82.

Figure 4B:
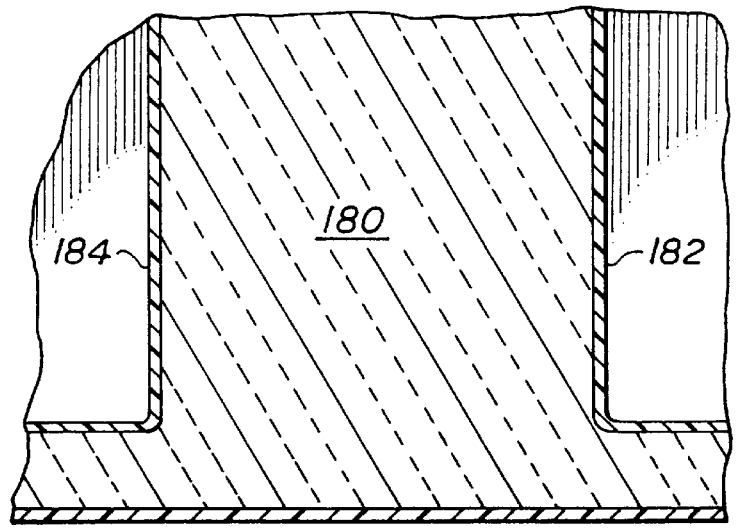
FIG. 4B is a partial sectional view of an insulating barrier according to still another preferred embodiment of the present invention.

FIG. 4B illustrates a partial sectional view of an insulating barrier according to yet another embodiment of the present invention. According to FIG. 4B, insulation barrier 180 is disposed between first plastic member 182 and second plastic member 184. Insulation barrier 180 separates refrigerated storage space 186 from coffee pot space 188. Insulation barrier 180 is preferably thicker directly between refrigerated storage space 93 and coffee pot space 90 than the portion separating refrigerated storage space 93 and coffee pot space 90 from an area external to the coffee brewing station.

Turning now to FIG. 6, an elevated perspective view of coffee bean grinding unit 17 is illustrated. Coffee bean grinding unit 17 includes coffee bean basket 110 disposed above grinding device 112. Coffee beans which are placed into bean basket 110 are ground by a rotating blade (not shown) contained within grinding device 112. Grinding device includes a control panel for changing the speed of the rotating blade to thereby alter the coarseness of the grind. The ground coffee beans are then disposed within ground coffee basket 114.

FIG. 7 illustrates coffee station 11 in a dual unit configuration. As illustrated, refrigeration unit 130 includes insulated door 132 for maintaining a cold temperature therein. As illustrated, a number of items may be placed within refrigeration unit 130 by way of insulated door 132 such as milk 134, coffee mug 136, and coffee bean bag 138. Coffee bean bag 138 is disposed upon removable shelf 140. Insulated door 132 includes door handle 142 which is attached to housing unit 144 by way of a plurality of hinges 146. A pair of recessed handles 148 are alternately disposed within the sides of coffee station 11.

FIG. 7 also illustrates coffee brewing unit 150 having coffee pot 152 and ground coffee basket 154 according to an embodiment of the present invention. Coffee brewing unit 150 is significantly different than brewing unit 14 of FIG. 1. Coffee brewing unit 150 includes a generally circular coffee pot 152 and a generally rounded and protruding ground coffee basket 154. Coffee pot 152 includes handle 153 which may protrude from the face of housing unit 144. Coffee basket 154 is opened outwardly from the face of housing unit 14 such that coffee filters and ground coffee may be placed therein. Water enters coffee brewing unit 150 by opening coffee unit lid 156.

A significant departure from brewing unit 14 is the incorporation of raised heating element which is disposed above control panel 160. By placing raised heating element above control panel 160 contact with housing unit 144 is minimized to thereby reduce the transfer of heat between heating element 158 and refrigeration unit 130. As an additional means of insulation, air buffer zone 162 separates coffee pot 152 and heating element 158 from contact with housing unit 144. As a further matter, the rounded design of coffee pot 152 increases the physical space of air buffer zone 162 itself to provide an additional level of insulation. Control panel 160 includes clock 164 and a number of control buttons 166 for automatically programming the operation of coffee brewing unit 150 by way of internal electronic circuitry.

The dimensions of the present invention are very important features. Coffee brewing station 11 is a bookshelf unit which may comfortably fit within a bookshelf of a bookcase. Coffee brewing station 11 may also easily fit on a counter top such as that found in a kitchen or office. Moreover, brewing station 11 may readily fit in an office on a credenza or the corner of a desk. Brewing station 11, in the dual unit embodiment of FIG. 7, is preferably less than 24 inches in length with a preferred length of 20 inches. However, the objects of the present invention may be clearly met with a brewing station between 12 inches and 36 inches (for the dual unit embodiment).

Figure 8:
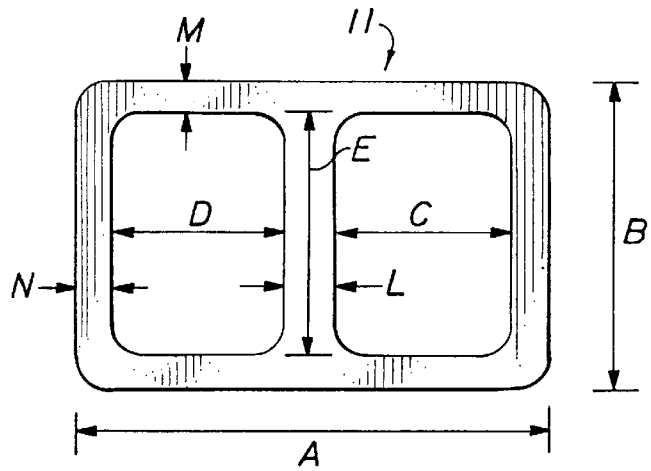
FIG. 8 is a schematic dimensional representation of the coffee brewing station of FIG. 7.
Figure 9:
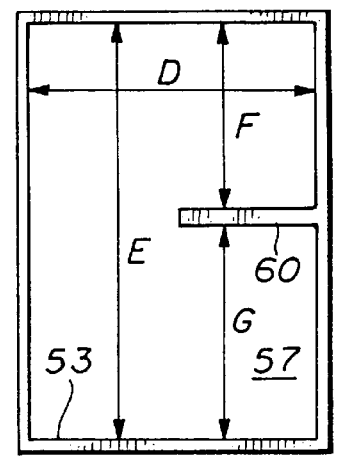
FIG. 9 is a schematic dimensional representation of a storage space illustrated in FIG. 3.
Figure 10:
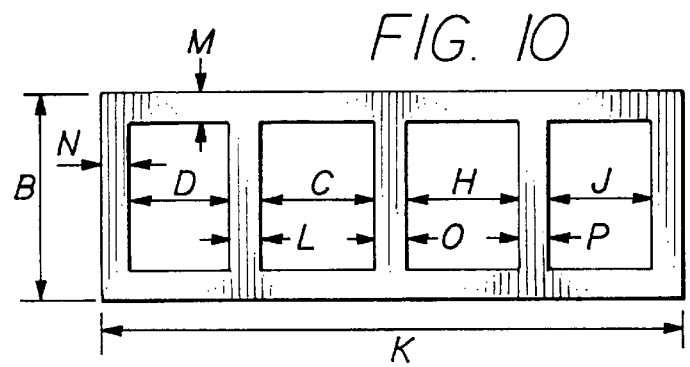
FIG. 10 is a schematic dimensional representation of a coffee brewing station according to yet another preferred embodiment of the present invention.

Turning now to FIGS. 8, 9, and 10 a number of dimensions of brewing station 11 are illustrated. FIG. 8 illustrates the dimensions of brewing station 11 of FIG. 7. FIG. 9 illustrates the dimensions of storage space 57 of FIG. 2. FIG. 10 illustrates the dimensions of brewing station 170 when grinding unit 17 of FIG. 6 is combined with brewing station 11 of FIG. 1.

TABLE I sets forth a preferred dimensional range for practicing the present invention, although it should be understood that many of the novel features of the present invention may be practiced without strictly adhering to the dimensional rages of TABLE 1.

TABLE I

| | |
|---|---|
| A | 12"–36" |
| B | 8"–24" |
| C | 4"–12" |
| D | 4"–24" |
| E | 6"–16" |
| F | 3"–8" |
| G | 3"–8" |
| H | 3"–10" |
| J | 2"–8" |
| K | 14.7"–66" |
| L | .5"–4" |
| M | .5"–3" |
| N | .5"–3" |
| O | .1"–1" |
| P | .1"–1" |

TABLE II

| | |
|---|---|
| A | 18"–22" |
| B | 12"–16" |
| C | 7"–9" |
| D | 7"–9" |
| E | 10"–14" |

TABLE II-continued

| | |
|---|---|
| F | 5"–7" |
| G | 5"–7" |
| H | 5"–7" |
| J | 3"–5" |
| K | 28"–32" |
| L | 1"–3" |
| M | .5"–1.5" |
| N | .5"–1.5" |
| O | .25"–.75" |
| P | .25"–.75" |

Table II as set forth below provides more preferable dimensional ranges than those as set forth in TABLE I above.

Table III as set forth below provides the most preferable dimensional for practicing the present invention.

TABLE III

| | |
|---|---|
| A | 20" |
| B | 14" |
| C | 8" |
| D | 8" |
| E | 12" |
| F | 5.85" |
| G | 5.85" |
| H | 6" |
| J | 4" |
| K | 30" |
| L | 2" |
| M | 1" |
| N | 1" |
| O | .5" |
| P | .5" |

In the preferred dual unit embodiment as set forth in TABLE III above, brewing unit 14 is approximately 8 inches in length with refrigerated storage unit 12 approximately 8 inches and insulation barrier 50 separating brewing unit 14 and storage unit 12 by two inches.

The dimensions set forth above are very important to the present invention due to space considerations of the office or college dorm, taking into consideration the sizes of various components and coffee products such as milk containers, sugar containers and coffee mugs.

The foregoing is considered as illustrative only of the principles of the invention, and since numerous modifications and changes will become readily apparent to those skilled in the art, the invention present invention is not limited to the exact construction and operation shown and described, and accordingly, all suitable modifications and equivalents may be resorted to, falling within the scope of the following claims.

I claim:

1. An article of manufacture comprising:

a brewing device for brewing coffee or related beverages;

a refrigerated receptacle having a frontwardly openable door;

a molded case permanently connecting the brewer to the refrigerated receptacle, said molded case defining a void below said brewing device which is so configured and arranged to removably receive a coffee pot; and a heating element permanently connected to said molded case about a bottom portion of the void to support and warm the coffee pot.

2. An article of manufacture comprising:

a brewing device for brewing coffee or related beverages;

a brewer inner case surrounding at least one side of and permanently connected to said brewing device, said brewer inner case defining at least one side of a void below said brewing device, wherein the void is so configured and arranged to removably receive a coffee pot;

a refrigerated receptacle including a receptacle inner case which mates with a frontwardly openable door; and an outer case permanently connected to the brewer inner case and the receptacle inner case, wherein said outer case, said brewer inner case and said receptacle inner case define an air impermeable pocket such that the pocket separates said brewer inner case and said receptacle inner case.

3. An article of manufacture comprising:

a brewing device for brewing coffee or related beverages;

a refrigerated receptacle having a frontwardly openable door;

a molded case permanently connecting and surrounding said brewing device and said refrigerated receptacle, wherein said molded case has a length equal to or less than 36 inches, and a height equal to or less than 24 inches.

4. The article of manufacture according to claim 1, wherein the molded case comprises:

a first inner shell surrounding said refrigerated receptacle;

a second inner shell surrounding said brewing device and the void; and an outer shell connected to and supporting said first inner shell and said second inner shell.

5. The article of manufacture according to claim 4, wherein said outer shell is connected to said first inner shell by a plurality of hollow supporting ribs.

6. The article of manufacture according to claim 5, wherein said outer shell is connected to said second inner shell by a plurality of hollow supporting ribs.

7. The article of manufacture according to claim 4, wherein said outer shell is connected to said second inner shell by a plurality of hollow supporting ribs.

8. The article of manufacture according to claim 1, wherein said molded case defines a bottom portion of the void such that the bottom portion has a planar portion, and a portion of said heating element is disposed below the planar portion.

9. The article of manufacture according to claim 1, wherein said molded case defines a bottom portion of the void such that the bottom portion has a planar portion, and said heating element is disposed above the planar portion.

10. The article of manufacture according to claim 1, further comprising:

a second brewing device for brewing espresso, wherein said second brewing device is permanently connected to said molded case.

11. The article of manufacture according to claim 1, further comprising:

a first inner shell surrounding said refrigerated receptacle, said first inner shell being configured and arranged to mate with the frontwardly openable door, said first inner shell including a first inner layer, a second inner layer surrounding said first layer, and a third insulating layer sandwiched between the first inner layer and the second inner layer;

a second inner shell surrounding at least three sides of said brewing device and at least two sides of the void, wherein said second inner shell including a fourth inner layer, a fifth inner layer, and a sixth insulating layer sandwiched between the third inner layer and the fourth inner layer; and an outer shell connected to and supporting said first inner shell and said second inner shell.

12. The article of manufacture according to claim 11, wherein said outer shell is connected to said first inner shell by a plurality of hollow supporting ribs.

13. The article of manufacture according to claim 12, wherein said outer shell is connected to said second inner shell by a second plurality of hollow supporting ribs.

14. The article of manufacture according to claim 1, wherein the molded case comprises a first inner shell surrounding said refrigerated receptacle, wherein said first inner shell is connected to a storage shelf which protrudes from an interior side of said first inner shell into said refrigerated receptacle.

15. The article of manufacture according to claim 2, wherein the air impermeable pocket is a vacuum chamber from which air has been removed.

16. The article of manufacture according to claim 2, wherein said brewer inner case defines a second side of the void below said brewing device, said article of manufacture further comprising a heating element permanently connected to the second side to support and warm the coffee pot.

17. The article of manufacture according to claim 3, wherein the refrigerated receptacle is between 4 and 24 inches in width and said molded case defines a void below said brewing device which is so configured and arranged to removably receive a coffee pot.

18. The article of manufacture according to claim 17, wherein the void and said refrigerated receptacle are separated by an insulating layer between 0.5 and 4 inches.

19. The article of manufacture according to claim 17, wherein the void and said refrigerated receptacle are separated by an insulating layer between 0.5 and 4 inches and said refrigerated receptacle is connected to a top insulation layer between 0.5 and 3 inches, a bottom layer between 0.5 and 3 inches, and a side layer between 0.5 and 3 inches.

20. The article of manufacture according to claim 3, wherein said refrigerated receptacle has an interior width between 4 and 24 inches and an interior height between 6 and 16 inches, and said molded case defines a bottom portion of a void below said brewing device, said article of manufacture further comprising a heating element connected to the bottom portion below said brewing device.

* * * * *